Patented Apr. 13, 1948

2,439,374

UNITED STATES PATENT OFFICE 2,439,374

METHYL METHACRYLATE COMPOSITIONS OPAQUE TO X-RAYS

Sidney Arthur Leader and James Joseph Gordon, London, England, assignors to Portland Plastics Limited, London, England, a British company No Drawing. Application March 20, 1945, Serial No. 583,836. In Great Britain December 15, 1944

1 Claim. (Cl. 260—83)

This invention relates to synthetic resinous methyl methacrylate compositions opaque to X-rays.

As is well known solid polymers of methyl methacrylate are now used extensively in the manufacture of transparent sheets and other articles and also in the manufacture of dental and surgical prostheses.

It sometimes happens that pieces of the polymerised methyl methacrylate resins penetrate the human body or are swallowed and are often difficult to locate since they are not opaque to X-rays.

It is an object of the present invention to provide a means for rendering a transparent or translucent thermoplastic resin such as polymerised methyl methacrylate opaque to X-rays whilst still allowing it to be transparent or translucent to light rays and preferably without colouring it.

For surface markings on the body, prior to radiography, it is often desirable to paint the area or outline the region (e. g. with a circle or cross) to correlate it with symptoms and X-rays findings. Thus, for example, a tender spot on an edentulous gum may be due to a small buried root. It is now the custom to construct a wire frame and fix it with difficulty to the gum, and if a root be present on X-rays finding, to correlate it with a definite spot. The shadow cast is, however, misleading as to origin.

It is a further object of the invention to provide a thermoplastic synthetic resinous composition which may or may not be transparent to light but which will be opaque to X-rays and which can be used as a paint or like coating for the above-mentioned purpose.

With these objects in view the present invention provides a material opaque to X-rays but preferably transparent to light rays comprising a thermoplastic synthetic resin which is preferably transparent to light having incorporated therein a bromine compound.

The thermoplastic synthetic resin may be solid or liquid or may be a solid dissolved in a solvent.

Examples of thermoplastic synthetic resins which may be used are methyl methacrylate and other esters of methacrylic acid and arcylic acid esters.

The resins which we prefer to use are polymerised methyl methacrylate resins.

The bromine compound will in general be present in a proportion of between 1% and 15% by weight of the thermoplastic synthetic resins but in some cases the proportion may be as high as 25% or even more. In each case it is sufficient to render the material opaque to X-rays.

The bromine compound may be incorporated in any convenient manner but in general it will be added to the monomer. Thus, in the case of methyl methacrylate it may be added to the monomer before polymerisation or to a liquid partly polymerised methyl methacrylate, or to a dough of monomer and solid polymer.

Alternatively, it may be intimately mixed with a resin powder or it may be dissolved in a volatile organic solvent and agitated with a resin powder with simultaneous or subsequent evaporation of the solvent. These two last-mentioned methods are especially useful when the bromine or bromine compound is insoluble in the monomer and particularly when dry moulding of the mixture is to be effected. The polymerisation may be effected in any convenient manner and in the case of polymerisation in a dispersion a bromine compound may be added to the monomer to be polymerised and will at the conclusion of the polymerisation be found in the solid polymer. The polymerisation may be effected in the presence of a polymerisation catalyst such as benzoyl peroxide.

It will be understood that the present invention also includes a composition for making the aforesaid material opaque to X-rays comprising a monomeric substance capable of polymerising to a thermoplastic resin and/or a liquid polymer thereof and a bromine compound.

It should also be understood that the bromine compound may be formed in situ by the combination of the monomer and/or polymer of the thermoplastic synthetic resin with the bromine.

The materials of the present invention may also include the usual additives such as plasticisers and catalysts.

Examples of bromine compounds which may be used are brominated hydrocarbons, e. g. ethylene dibromide.

The following examples, in which the parts are by weight, illustrate how the material of the present invention may be manufactured:

Example I 5 parts of ethylene dibromide were dissolved in 100 parts of monomeric methyl methacrylate and 1 part of benzoyl peroxide was added thereto. The mixture was polymerized at 80° C. for 3 hours. A colorless brilliantly transparent resin was obtained which was hard and resilient and very opaque to X-rays.

Example II 70 parts of monomeric methyl methacrylate were mixed with 20 parts of ethylene dibromide and to this liquid was added 300 parts of solid polymeric methyl methacrylate and 0.5 part of benzoyl peroxide. The resultant dough when placed in a mold and heated at 80° C. for 1 hour produced a solid, colorless transparent resin which was opaque to X-rays.

*Example III*

Example II was repeated but using 30 parts of ethylene dibromide instead of 20 parts. A solid, colorless transparent resin was obtained which was very opaque to X-rays.

We claim:

A material opaque to X-rays comprising polymerised methyl methacrylate having incorporated therein ethylene dibromide in a proportion sufficient to render the material opaque to X-rays.

SIDNEY ARTHUR LEADER.
JAMES JOSEPH GORDON.

REFERENCES CITED

The following references are of record in the file of this patent:

UNITED STATES PATENTS

| Number | Name | Date |
| --- | --- | --- |
| 1,913,127 | Ostromislensky | June 6, 1933 |
| 2,098,539 | Charch | Nov. 9, 1937 |
| 2,162,178 | Marasco | June 13, 1939 |
| 2,255,940 | Rogers | Sept. 16, 1941 |
| 2,269,187 | D'Alelio | Jan. 6, 1942 |
| 2,293,413 | Stoner | Aug. 18, 1942 |
| 2,334,358 | Smith | Nov. 16, 1943 |
| 2,335,651 | D'Alelio | Nov. 30, 1943 |
| 2,343,090 | Smith | Feb. 29, 1944 |
| 2,346,107 | Johnson | Apr. 4, 1944 |
| 2,404,791 | Coffman | July 30, 1946 |

OTHER REFERENCES

Bartlett, Jour. Amer. Chem. Soc., April 1943, pp. 543–546.